United States Patent [19]

Dooley et al.

[11] 4,295,364
[45] Oct. 20, 1981

[54] TRANSDUCER DEVICE FOR MONITORING OF FUEL INJECTION

[75] Inventors: Joseph L. Dooley, Chicago; Daniel J. Dooley, Burr Ridge, both of Ill.

[73] Assignee: Creative Tool Company, Burr Ridge, Ill.

[21] Appl. No.: 73,251

[22] Filed: Sep. 7, 1979

[51] Int. Cl.³ ............................................ G01M 19/00
[52] U.S. Cl. .................................................. 73/119 A
[58] Field of Search .............. 73/119 A, 730; 310/338

[56] References Cited

U.S. PATENT DOCUMENTS

| | | | |
|---|---|---|---|
| 3,880,008 | 4/1975 | Eilersen | 73/119 A X |
| 4,109,518 | 8/1978 | Dooley et al. | 73/119 A |
| 4,192,179 | 3/1980 | Yelke | 73/119 A |
| 4,194,401 | 3/1980 | Claassen | 73/119 A X |

FOREIGN PATENT DOCUMENTS 2649358 10/1977 Fed. Rep. of Germany ... 73/119 A

Primary Examiner—Jerry W. Myracle
Attorney, Agent, or Firm—Neuman, Williams, Anderson & Olson

[57] ABSTRACT

A transducer device is provided which is arranged to be mounted on flow path-defining structure of a fuel injection system, preferably on the outside of a delivery valve housing including a chamber in which a surge of pressure is built up during operation of the injection pump to cause a transducer of the device to develop a high amplitude and high rate of change electrical signal. The device is readily clamped in place and is light in weight with a center of gravity close to the axis of the chamber, the effect of engine vibrations being minimized. The signal from the device and a signal developed at a predetermined rotational position of the engine crankshaft are applied to an instrument which indicates the relative timing of the signals and the RPM.

7 Claims, 5 Drawing Figures

U.S. Patent      Oct. 20, 1981      4,295,364
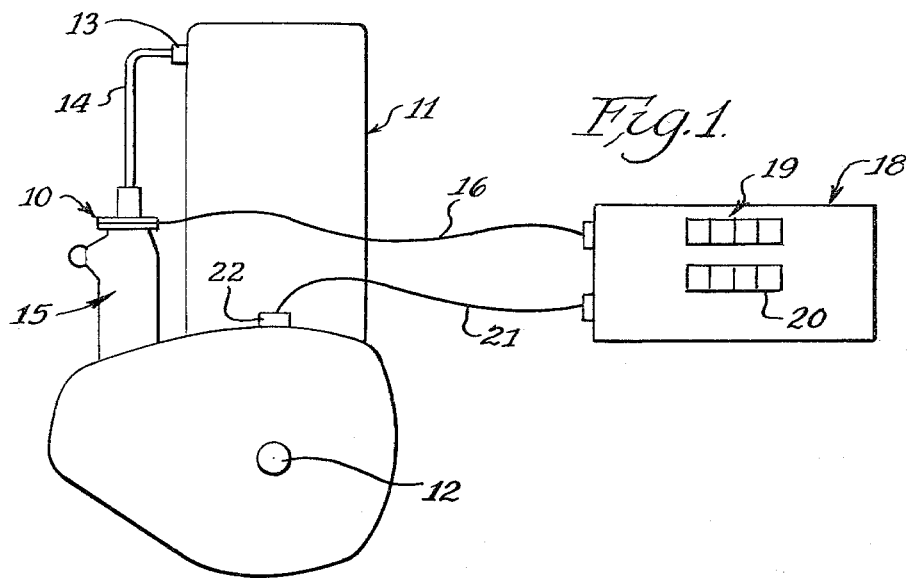
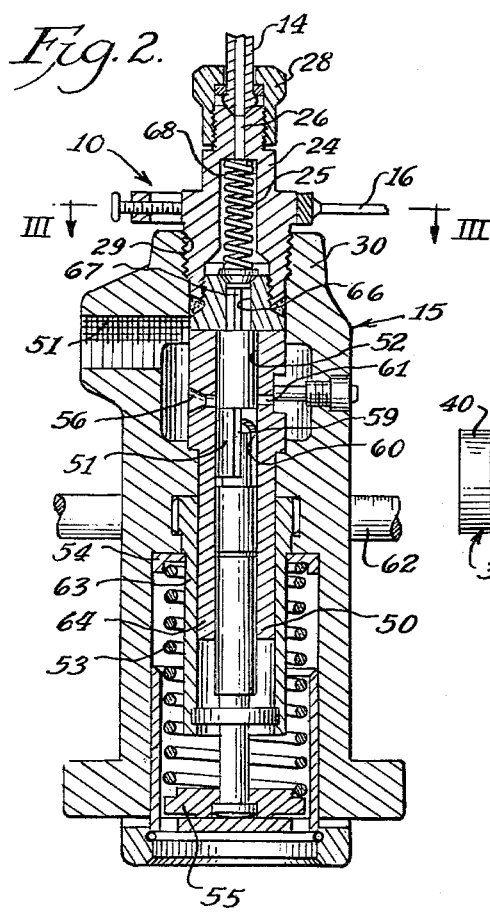
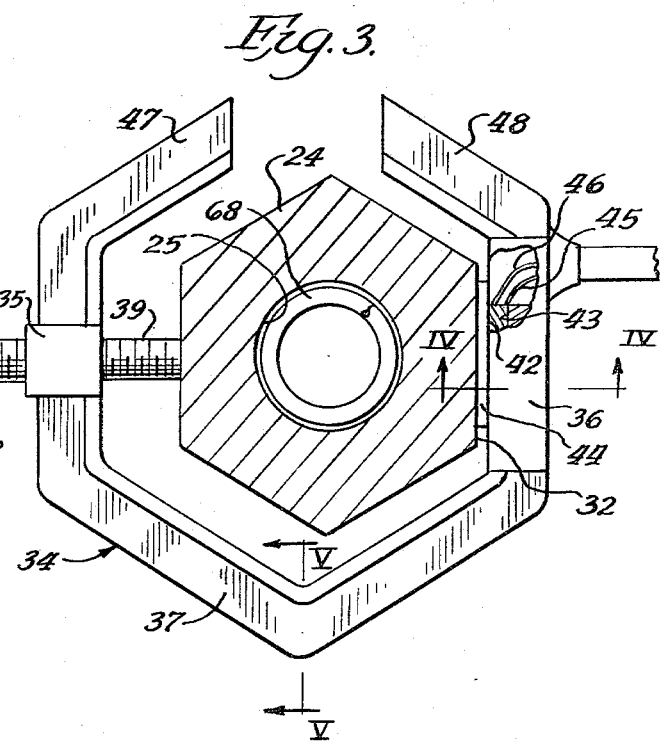
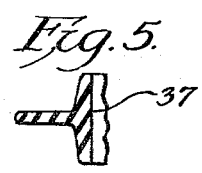
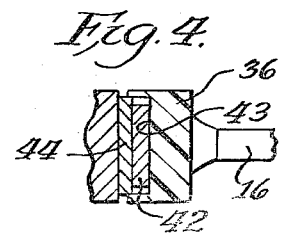

TRANSDUCER DEVICE FOR MONITORING OF FUEL INJECTION

This invention relates to a transducer device for monitoring of fuel injection and more particularly to a device for developing a signal which indicates the time of fuel injection with a high degree of accuracy and reliability. The device is relatively simple in construction and is compact and can be readily and quickly installed.

BACKGROUND OF THE INVENTION

In the past, piezoelectric elements have been clamped to fuel lines in an effort to detect the surge of fuel through those lines, but accurate and reliable results have not been produced. One problem which has not been recognized and dealt with is that the signal developed has been relatively low in relation to the ambient noise on the line resulting from the vibration of the engine. A piezoelectric transducer has also been applied to an end fitting of a fuel line to detect the tendency of the fuel line to separate from the pump at one end, or from the nozzle at the other end, during fuel surges within the line. Such a system is disclosed in the Dooley et al. U.S. Pat. No. 4,109,518. To utilize these piezoelectric transducers, it has been necessary to disconnect the end fitting, at least momentarily, during the application of the transducer to the engine, thereby creating a potential for contamination of the fuel and/or leakage.

SUMMARY OF THE INVENTION

This invention was evolved with the general object of overcoming disadvantages of prior arrangements and of providing a device which can be easily installed and which will produce accurate and reliable indications of the time of fuel injection.

In accordance with the invention, a transducer device is provided which is adapted for installation on a fuel injection system of the type including a nozzle assembly for injection of fuel into an engine cylinder, a fuel line having one end connected to the nozzle assembly and an injection pump assembly connected to the opposite end of the fuel line and having a plunger movable in a plunger chamber therewithin. In such a system, the nozzle assembly, fuel line and pump assembly together provide a flow path-defining structure and an aspect of the invention is in recognizing that when the fuel is pressurized by operation of the plunger of the pump, the circumferential or peripheral dimension at each point along the length of the flow path is increased in proportion to the pressurization of the fuel. The dimensional increase at one point along a path is detected by the transducer device of the invention which includes means for engaging peripherally spaced surface points on the outside of the structure which defines the flow path. The device further includes transducer means for developing an electrical signal in response to relative movement of such portions, and mounting means for supporting the transducer and engagement means.

Another aspect of the invention is in the recognition that all portions of the injection system are subject to vibratory movements in response to operation of the engine and that such movements might produce an output from the transducer means of large magnitude. In accordance with this invention, the mounting, transducer and engagement means are so arranged that any component of the electrical signal developed by the transducer means in response to vibratory movement of the structure is no more than a small fraction of the electrical signal developed by the transducer means from relative movement of the engaged surface portions in response to pressurization of the fuel. With this feature, an indication is obtained which is highly accurate and reliable. Also, since only external surface portions of the injection system need be engaged, the device can be designed to be readily installed without disturbing the operation of the fuel injection system.

In accordance with a specific feature of the invention, the effect of vibratory forces is minimized by providing mounting means for the engagement and transducer means which mounting means has a size and configuration such as to obtain sufficient strength and rigidity for securely engaging the engagement means with surface portions on the outside of the flow-path-defining structure while minimizing the weight of the device. With vibratory movements of the flow path-defining structure, the mounting means moves with the structure and does not vibrate relative thereto to thereby minimize the effect on the transducer means.

Another specific feature is in providing mounting means having a configuration such as to obtain a center of gravity close to the axis of the flow path-defining structure, to minimize rotational vibratory movement about that axis and to minimize the effect on the transducer means.

In accordance with a further specific feature of the invention, the device is arranged for installation on the outside of a portion of a flow path-defining structure which has an internal chamber therewithin with an outlet passage from the chamber of restricted cross-sectional area in relation to that of the chamber. The internal chamber may, for example, be a chamber associated with a delivery valve including a valve element urged to a seated position by a coiled compression spring located within the internal chamber.

When the plunger of the pump is operated and when sufficient pressure is built up in the plunger chamber, the valve element is moved away from its seat to admit fluid under relatively high pressure into the internal chamber. The restricted size of the outlet passage also contributes to a build-up of pressure in the chamber and a high pressure is developed which causes a circumferential expansion of the structure around the internal chamber which is relatively large in magnitude. In addition to being of large amplitude, the pressure is built up rapidly, in a very short interval of time, so that the dimensional change is quite rapid. It is found that the amplitude and rate-of-change of the corresponding electrical signal developed is such as to provide a high degree of discrimination against signal components produced by vibrations of the injection pump assembly.

The device may be designed for installation at any point along the outside of a flow path-defining structure but for the foregoing reasons, it is particularly advantageous when arranged for installation of the outside of a portion of the structure which has an internal chamber as described, particularly when it is a chamber such as a delivery chamber into which fluid is admitted through a spring-biased element, a high amplitude and high rate-of-change electrical signal being produced.

Another advantage is arranged by locating the device on or near the delivery valve structure associated with a fuel injection pump assembly in that the signal is obtained which can be applied to appropriate instrumentation to obtain important timing information not available with other types of systems. A specific feature of the invention is a development of a signal corresponding to the instant of injection of fuel into a delivery valve associated with a fuel injection pump assembly and in the development of a signal corresponding to a predetermined rotational position of an engine crank shaft, such as that corresponding to a top dead center position of a cylinder, with such signals being applied to an instrument which indicates the relative timing of such signals. Such timing may be indicated as elapsed time in fractions of a second or as the rotational angle, the rotational angle being determinable from the elapsed time when the rotational speed is known.

This invention contemplates other objects, features and advantages which will become more fully apparent from the following detailed description taken in conjunction with the accompanying drawings.

BRIEF DESCRIPTION OF THE DRAWINGS

FIG. 1 diagrammatically illustrates a transducer device constructed in accordance with the invention and shown installed on a fuel injection system of an engine connected to an indicating instrument;

FIG. 2 is a sectional view through the transducer device of the invention and through an injection pump assembly on which it is mounted in the illustrated arrangement;

FIG. 3 is a sectional view, on an enlarged scale, and taken substantially along line III—III of FIG. 2, providing a top plan view of the transducer device of the invention;

FIG. 4 is a sectional view taken substantially along line IV—IV of FIG. 3, illustrating the mounting of a transducer of the device; and FIG. 5 is a sectional view taken substantially along line V—V of FIG. 3, illustrating the construction of a mounting element of the device.

DESCRIPTION OF A PREFERRED EMBODIMENT

Referring to FIG. 1, reference numeral 10 generally designates a transducer device constructed in accordance with the principles of this invention, shown installed on an engine 11 which, as diagrammatically illustrated, may include a crankshaft 12, an injection nozzle assembly 13 connected to one end of a fuel line 14 and injection pump assembly 15 connected to the opposite end of the fuel line 14. The injection pump 15 may be operated from cams on an auxiliary drive shaft driven from the crankshaft 12. Only one nozzle assembly, one fuel line and one section of an injection pump are illustrated, it being understood that one nozzle assembly, one fuel line and one injection pump section may be used for each cylinder of the engine.

The device 10 in the system as illustrated develops an electrical signal in response to operation of the injection pump assembly 15, the electrical signal being applied through a cable 16 to an instrument 18 which may include digital displays 19 and 20. Instrument 18 is connected through a cable 21 to a device 22 mounted on the engine 11 and arranged to develop a signal when the crankshaft is at a predetermined rotational reference position such as when a particular cylinder is at a top dead center position. The display 19 may indicate RPM and the display 20 may indicate the timing of the operation of the injection pump assembly relative to the reference position. Such timing may be indicated either in terms of elapsed time in fractions of a second or in terms of the rotational angle, the rotational angle being measurable from measurements of elapsed time and RPM.

In the illustrated arrangement, the transducer device 10 is mounted on a delivery valve holder 24 which is mounted on the injection pump assembly 15 and which includes a generally cylindrical internal chamber 25 and an outlet passage 26 therefrom. The end of the fuel line 14 is coupled to the holder 24 through a compression fitting 28 so that the fuel line passage communicates with the outlet passage 26. As hereinafter described, when a plunger of the injection pump assembly is operated, a surge of pressure is thereafter developed within the chamber 25. The chamber has a cross-sectional area which is substantially greater than that of the outlet passage 26, as well as that of the internal passage of the fuel line 14. As a result, the magnitude of the pressure surge is increased. The pressure surge creates a peripheral expansion of the delivery valve holder 24 which is sensed by the transducer device 10 to develop an electrical signal indicating the timing of the fuel injection.

The device 10 is constructed to take advantage of the fact that the delivery valve holder 24 is removably threaded into an opening 29 in a housing 30 of the injection pump assembly 15 and the delivery valve holder has outer planar surface portions in hexagonal relation, for engagement by a wrench in installing or removing the holder 24. The transducer device 10 includes means for engaging a pair of oppositely facing ones of such surface portions, indicated by reference numerals 31 and 32, and it responds to a change in the spacing of such surface portions to develop the output electrical signal.

As shown, the device 10 is arranged to be clamped in position and it includes a mounting element 34 having portions 35 and 36 on opposite sides of the valve holder 24, portions 35 and 36 being interconnected by an offset intermediate portion 37. A screw 38 is provided having a shank portion 39 threaded through the portion 35 to engage the end thereof with the surface portion 31 and having a head portion 40 outside. A transducer 42 is carried by the portion 36 and in the illustrated construction, it is in the form of a piezoelectric plate having electrodes on opposite faces thereof. The outer face of the plate 42 is supported against a surface 43 of the portion 36 of the mounting element 34 and the inner face of the transducer 42 is effectively engaged with the surface portion 32 of the valve holder 24, through a layer 44 of a solid material.

The electrode on the outer face of the plate 42 is connected through a lead 45 of an outer shield of the cable 16 while the electrode on the inner face of the plate 42 is connected through a lead 46 to a central conductor of the cable 16.

In operation, the screw 38 is tightened to a degree sufficient to obtain firm engagement between the end of the shank portion 38 and the inner surface of the layer 44 and the respective surfaces 31 and 32 of the holder 24. Then whenever the holder 24 is expanded due to a surge of pressure within the chamber 25, the compression of the piezoelectric plate 42 is increased to develop a corresponding electrical signal between the electrodes on its opposite faces, the signal being applied through the cable 16 to the instrument 18.

The fuel injection system is subject to vibratory forces during operation of the engine and to minimize the development of electrical signal components in response to such vibratory forces, the mounting element 34 should be rigid while also being light in weight so as to minimize any change, in response to vibratory forces, in the spacing between the surface 32 of the valve holder 24 and the surface 43 which supports the outer face of the transducer 42. Thus, the intermediate portion 37 may be so formed as to provide increased rigidity and strength relative to the weight thereof, as by using a generally T-shaped cross-sectional configuration as shown in FIG. 5.

It is also important to minimize the possibility of any angular oscillatory movement of the device about the axis of the holder 24 and, for this purpose, portions 47 and 48 may be provided on the mounting element 34, extending from the portions 35 to be on a side of the valve holder 24 opposite the side on which the portion 37 is disposed. The size and configuration of the portions 47 and 48 should be such as to position the center of gravity of the device 10 close to the axis of the holder 24. Thus, the possibility that vibratory forces will be translated into regular vibratory movements about the axis of the holder 24 is minimized. It is noted that the mounting element 34 might be arranged to completely surround the delivery valve holder 24 but to avoid the need to remove the valve holder 24 for installation, the ends of the portions 47 and 48 of the illustrated device are spaced apart a distance sufficient to permit the device to be slipped over the fuel line 14 during installation, thus permitting installation without disturbing the connections of the fuel injection system. Other forms of clamps might be used, but in any case, it is desirable that the device be rigid and as light in weight as possible and that the center of gravity be close to the axis of the part on which it is installed.

The mounting element 34 and the screw 38 may desirably be of a lightweight plastic material but may be made of metal, preferably a lightweight metal such as aluminum. When the element 34 is of metal, it may be used as an electrical ground connected to the electrode on the outer face of transducer 42 and to the shield of the cable 16.

The device 10 may be installed at a number of points along the outside of the fuel flow path from an injection pump assembly to the exit from a nozzle assembly and in any case, it should be shaped and dimensioned to minimize weight and to position its center gravity close to the axis of the fuel flow path. The mounting of the device around a delivery valve chamber, however, has certain important advantages and is generally preferred. One advantage arises because of the manner in which a surge of pressure is built up within the delivery valve chamber 25 to cause a peripheral dimensional expansion of the surrounding wall of the holder 24.

A typical type of injection pump assembly is illustrated in FIG. 2. A plunger 50 is provided which includes a pump element 51 at its upper end movable in a cylindrical chamber 52. The plunger 50 is shown in FIG. 2 in its lowermost position and is movable upwardly from a cam, not shown, on an auxiliary shaft of the engine, the plunger being returned to the position shown by a coiled compression return spring 53 acting between a spring seat 54 supported in the housing 30 and a spring seat 55 carried at the lower end of the plunger 50.

When the plunger 50 is at its lowermost position as illustrated, fuel may flow into the chamber 53 through an inlet port 56 which communicates with an inlet passage 57 to which fuel is supplied from a suitable fuel pump. The chamber 52 communicates through a vertical slot 59 in the element 51 with a chamber defined in part by an angularly or spirally extending surface portion 60 of the element 51, the chamber so formed being normally filled with the liquid fuel. The chamber so formed communicates with a by-pass or spill port 61 at a certain point in the operation, depending upon the angular position of the element 51 which is controlled by a control rack 62 having teeth engaged with peripheral teeth of a control sleeve 63 which is secured to a sleeve 64 defining the chamber 52 as well as the inlet port 56 and the by-pass port 61.

The upper end of the plunger chamber 52 communicates through a passage 66, with the delivery valve chamber 25 and a delivery valve element 67 is engageable with a valve seat at the upper end of the passage 66, being urged thereagainst by a coiled compression delivery valve spring 68 located in the delivery valve chamber 25.

In operation, when the plunger 50 is driven upwardly by a cam of the engine, the liquid fuel is driven upwardly and when the pressure exceeds a value determined by the force of the spring 68, the liquid fuel surges into the chamber 25 to build-up pressure therewithin. Rapid exit of the fuel from the chamber 25 is inhibited due to the fact that the cross-sectional area of the outlet passage 26 is substantially less than that of the chamber 25. Thus, a relatively high pressure is developed within the chamber 25. Also, the pressure is developed quite rapidly. The overall result is that a relatively large expansion of the delivery holder 24 is produced rapidly and a high amplitude and high rate-of-change electrical signal is developed by the transducer 42.

When the pump element 51 reaches a position such that the by-pass port 61 is aligned with the chamber below the surface 60, the fuel may fall through the spot 59 and into the chamber and then out to the by-pass port to terminate the injection of fuel. The time at which this action occurs and thereby the amount of fuel injected is controlled by the position of the control rack 62.

It is noted that the illustrated fuel injection pump assembly is for a single cylinder but in a system for an engine having a plurality of cylinders, similar assemblies may be provided, one for each cylinder. It will be understood, of course, that the device is not limited to use with any particular type of fuel injection system.

With respect to the instrument 18, it is noted that any suitable circuitry may be used to provide indications of the timing of the signals and RPM. Types of instrumentation which might be used are illustrated in Weaver U.S. Pat. Nos. 3,511,088 and 3,698,249.

What is claimed is:

1. A transducer device for use in a fuel injection system including a nozzle assembly for injection of fuel into an engine, a fuel line having one end connected to the nozzle assembly and an injection pump assembly connected to the opposite end of the fuel line and having a plunger movable in a plunger chamber therewithin, wherein the nozzle assembly, fuel line and pump assembly together provide a flow path-defining structure including a thick-walled section providing an internal chamber and an outlet passage from said internal chamber, the outlet passage having a cross-sectional area substantially less than that of said internal chamber to produce in response to injection pump operation a pulse of pressure in said internal chamber and to thereby produce a momentary peripheral expansion and contraction of said thick-walled section, said transducer device comprising: engagement means arranged for engagement with surface portions on the outside of said thick-walled section, transducer means, and mounting means for removably mounting said transducer and engagement means on said thick-walled section without modification thereof and without disassembly of said flow path-defining structure, said transducer means being responsive to relative movement of said engagement means in response to said momentary peripheral expansion and contraction of said thick-walled section to generate an electrical output pulse of short duration.

2. In a transducer device as defined in claim 1, at least one of said external surface portions of said thick-walled section being a flat surface, and said transducer means comprising a piezoelectric plate having a flat surface in facing relation to said flat surface of said thick-walled section for direct coupling thereto through said engagement means.

3. In a transducer device as defined in claim 2, said thick-walled section having an outer surface of polygonal shape defining a plurality of flat surfaces useable in assembly of said flow path-defining structure, one of said flat surfaces being directly coupled through said engagement means to said piezoelectric plate.

4. In a transducer device as defined in claim 1, wherein said thick-walled section is provided by a fitting at the outlet end of said pump assembly.

5. In a system as defined in claim 4, said fitting being part of a delivery valve assembly wherein said internal chamber communicates through a spring-biased valve element with a plunger chamber of said pump assembly.

6. In a system as defined in claim 5, said mounting means comprising a clamp structure having an opening for installation on said fitting without disassembly of said flow path-defining structure and having a configuration such as to provide a center of mass close to the axis of said delivery valve assembly.

7. A method for monitoring the injection of fuel into a fuel line of a fuel injection system from an injection pump assembly including a delivery valve assembly of the type wherein the fuel is forced past a spring-valve element into a delivery chamber which has a cross-sectional area substantially larger than that of an outlet passage therefrom, said delivery valve assembly including a thick-walled section having a polygonal shape with a plurality of flat surfaces for facilitating installation of said delivery valve assembly, said method comprising: providing a transducer including a piezoelectric plate element and clamping said plate element against one of said flat surfaces to produce a short-duration electrical output pulse in response to each injection operation of said pump assembly, and monitoring electrical output pulses developed by said transducer means.

* * * * *